United States Patent
Stuth

[11] Patent Number: 5,690,824
[45] Date of Patent: Nov. 25, 1997

[54] SEPTIC SYSTEM SCREENED PUMP VAULT

[76] Inventor: William L. Stuth, P.O. Box 950, Maple Valley, Wash. 98038

[21] Appl. No.: 649,793

[22] Filed: May 17, 1996

[51] Int. Cl.$^6$ .................. B01D 35/02; B01D 35/027
[52] U.S. Cl. ............. 210/333.01; 210/334; 210/416.1; 210/522; 210/532.2
[58] Field of Search ............... 210/323.1, 332, 210/333.01, 334, 416.1, 521, 522, 532.1, 532.2

[56] References Cited

U.S. PATENT DOCUMENTS

| | | | |
|---|---|---|---|
| 4,439,323 | 3/1984 | Ball | 210/608 |
| 4,710,295 | 12/1987 | Zabel | 210/336 |
| 4,997,562 | 3/1991 | Warner | 210/532.2 |
| 5,242,584 | 9/1993 | Hoarau | 210/532.2 |
| 5,382,357 | 1/1995 | Nurse | 210/170 |
| 5,582,716 | 12/1996 | Nurse, Jr. | 210/532.2 |

OTHER PUBLICATIONS

"The Zabel Zone" Brochure of Zabel Environmental Technology.
Orenco Systems, Inc. drawings 4,4E,2 , 2F and 3.

*Primary Examiner*—W. L. Walker
*Attorney, Agent, or Firm*—Harry M. Cross, Jr.

[57] ABSTRACT

A septic system filtered pump vault comprises a housing for an effluent pump, a plurality of effluent filters contained within a filter compartment that is located in the housing, a filter support within the housing. The filters are secured to the filter support in spaced relation to one another so as to provide filtering sections between the filters. The filter support includes at least one backflush conduit provided with a plurality of backflush orifices oriented to direct backflush fluid into the filtering sections onto upper surfaces of the filters. An effluent pump is contained within the housing for effecting flow of effluent through the effluent inlet and through the filters. The pump includes a discharge conduit for discharging filtered effluent from the housing. Valving communicates with the backflush conduit and the discharge conduit so that the pump may be selectively communicated with the backflush conduit to effect backflushing of the filters with filtered effluent. The filter support includes an air conduit having an air discharge manifold, the air discharge manifold having air discharge orifices oriented to direct air into the filter compartment, and the valving communicates with the air conduit so that air from an external source may be selectively directed into the air discharge conduit for selectively aerating effluent contained with the filter compartment.

12 Claims, 5 Drawing Sheets

SEPTIC SYSTEM SCREENED PUMP VAULT

BACKGROUND OF THE INVENTION

1. Field of the Invention

This invention relates to filtering systems for septic systems and, more particularly, to filtering systems for screening septic system effluent entering effluent pumps.

2. Brief Description of the Prior Art

Various septic system effluent pumping systems are known. In such systems, it is desirable to filter septic system effluent so as to prevent solid waste particles from the being carried from one stage of the septic system to another stage. For example, it is becoming common to pump septic system effluent from a septic tank into a drain field, and the septic tank effluent is filtered before it is pumped into the drain field. In some such systems, the pumping unit may be incorporated into the septic tank or into a separate pump vault.

A primary difficulty attendant known septic effluent pump systems is the difficulty of maintaining the effluent filter in an unclogged condition. Because of the operating conditions of septic systems, the effluent filter will become sufficiently clogged to seriously interrupt the processing of the septic system effluent. When the filter becomes sufficiently clogged, the filter must be cleaned to enable the system to continue to function properly. Typical effluent filters employ filter screens to block solid waste particles from passing through the pump. When clogged, the screens must be cleaned or replaced to enable them to continue to function efficiently.

Some such filters are designed to have the filter element removed for cleaning or replacing. Heretofore, known septic system effluent pump systems have not been capable of having their effluent filters conveniently and economically maintained.

SUMMARY OF THE INVENTION

A primary object of the present invention is to provide a filter system for septic system effluent that can be better maintained in an unclogged condition. Another object of this invention is to provide such a filter system that can be employed with an effluent pump housed in a pump vault, where the pump vault can be installed in a septic system pump tank or in a separate pump chamber. A further object of the present invention is to provide such a filter system that can be backflushed with effluent from within the pump vault or backflushed with fresh water from an external source. Still another object of the invention is to provide such a filter system within which air can be introduced to the effluent within the pump vault. These and other objects and advantages of the present invention will become apparent from the following description of the preferred embodiment of the invention.

In accordance with the principles of this invention, the invention comprises a septic system filtered pump vault which comprises a housing for an effluent pump, a plurality of effluent filters contained within a filter compartment that is located in the housing and filter support means within the housing. The filters are secured to the filter support means in spaced relation to one another so as to provide filtering sections between the filters. The filter support means includes at least one backflush conduit provided with a plurality of backflush orifices oriented to direct backflush fluid into the filtering sections onto upper surfaces of the filters. Pump means, including an effluent pump, is contained within the housing for effecting flow of effluent through the effluent inlet and through the filters. The pump means includes discharge conduit means for discharging filtered effluent from the housing. Valve means communicates with the backflush conduit and the discharge conduit means so that the pump may be selectively communicated with the backflush conduit to effect backflushing of the filters with filtered effluent. The filter support means includes an air conduit having an air discharge manifold, the air discharge manifold having air discharge orifices oriented to direct air into the filter compartment, and the valve means communicates with the air conduit so that air from an external source may be selectively directed into the air discharge conduit for selectively aerating effluent contained with the filter compartment.

DESCRIPTION OF THE PREFERRED EMBODIMENT

Figure 1:
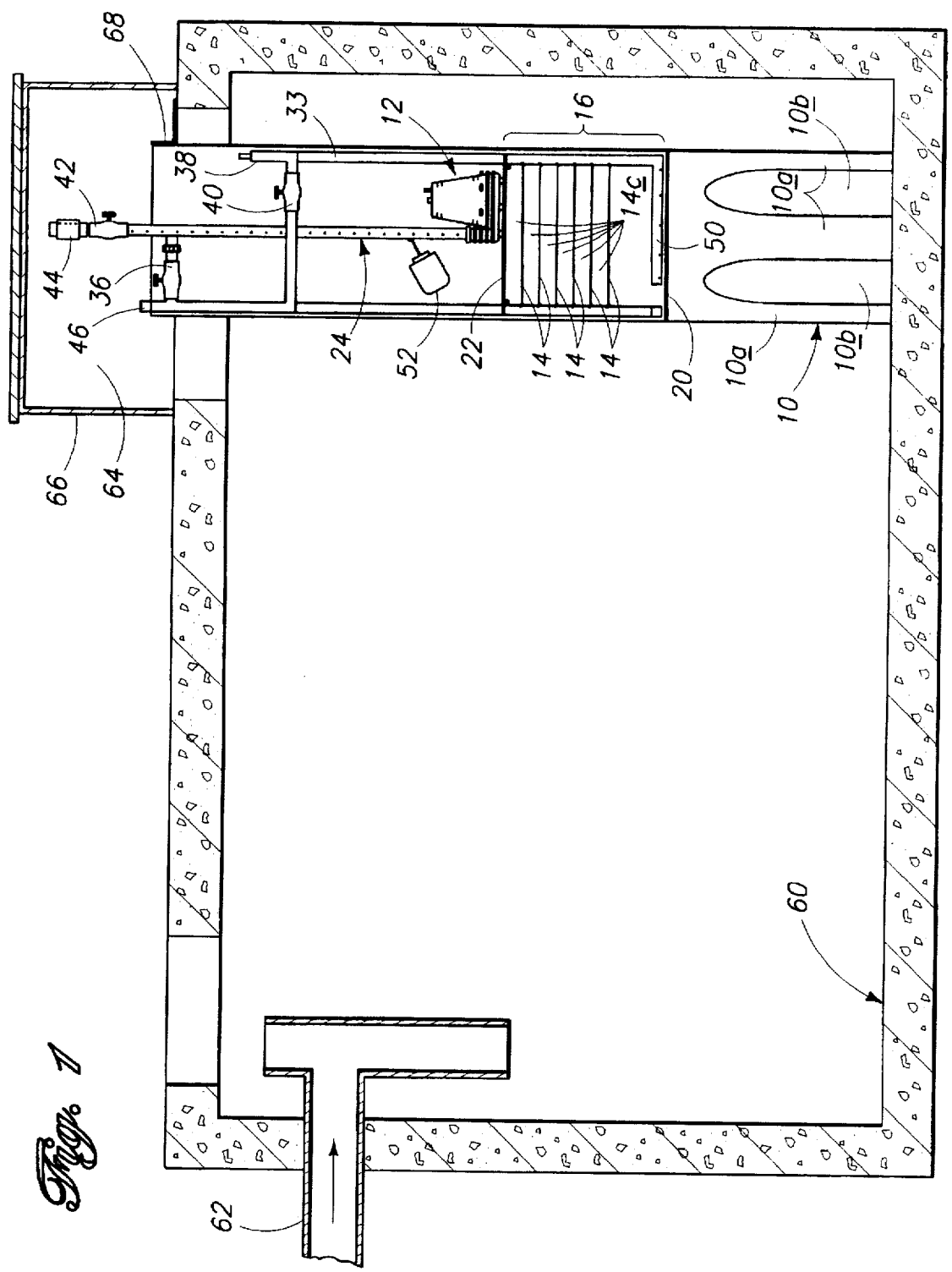
FIG. 1 is a vertical cross-section view through a pump tank or chamber incorporating a first embodiment of a filtered pumping system in accordance with the principles of this invention, including a pump vault that houses a column of filter screens supported by a support structure and a top plate for a centrifugal effluent pump.
Figure 2:
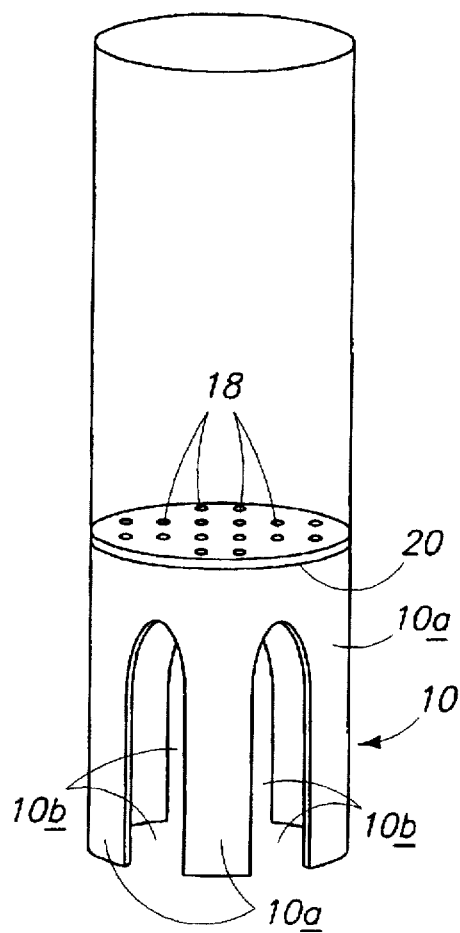
FIG. 2 is a perspective view of the pump vault structure of the FIG. 1 embodiment, including a bottom plate that supports the filter support structure.
Figure 3:
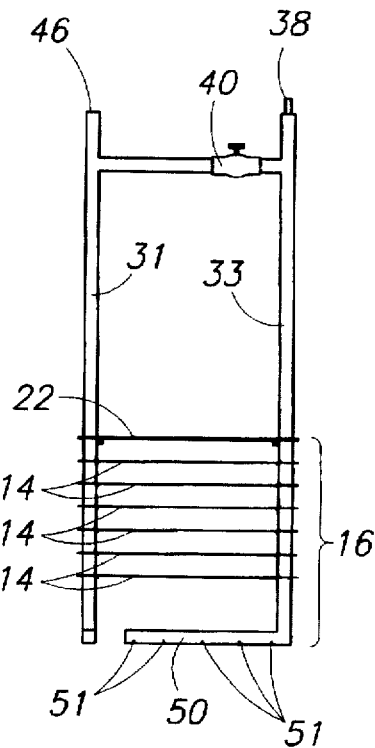
FIG. 3 is side elevation view of the effluent filter arrangement of the FIG. 1 embodiment.
Figure 9:
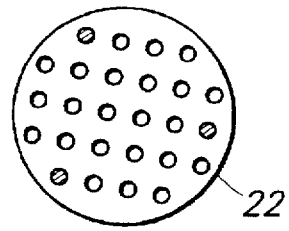
FIG. 9 is a top plan view of the top plate that supports the effluent pump.
Figure 7:
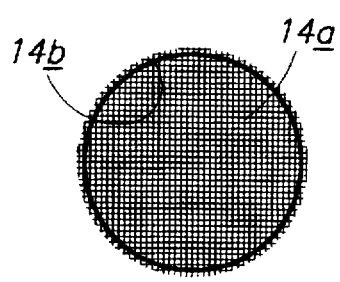
FIG. 7 is a top plan view of one of the filter screens.
Figure 8:
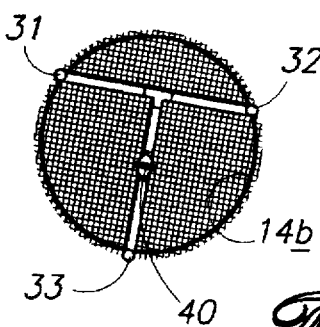
FIG. 8 is a top plan view of the top filter screens with the top plate removed.
Figure 4:
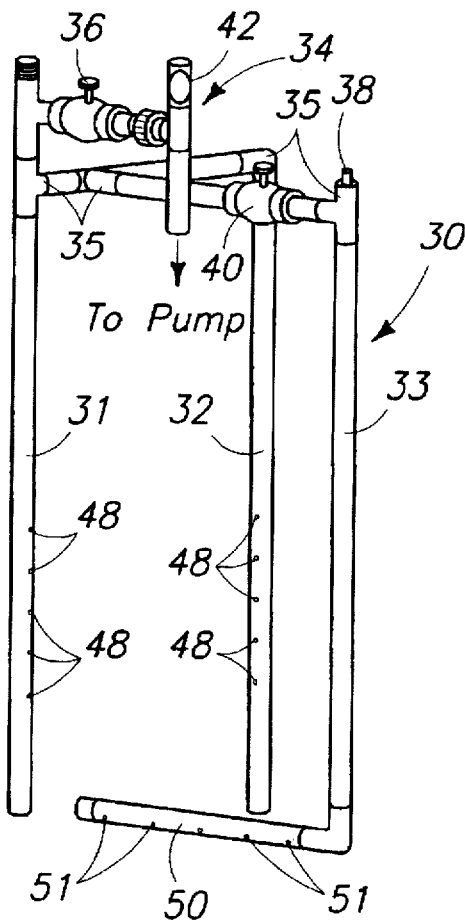
FIG. 4 is a perspective view of the FIG. 3 filter arrangement support structure.
Figure 5:
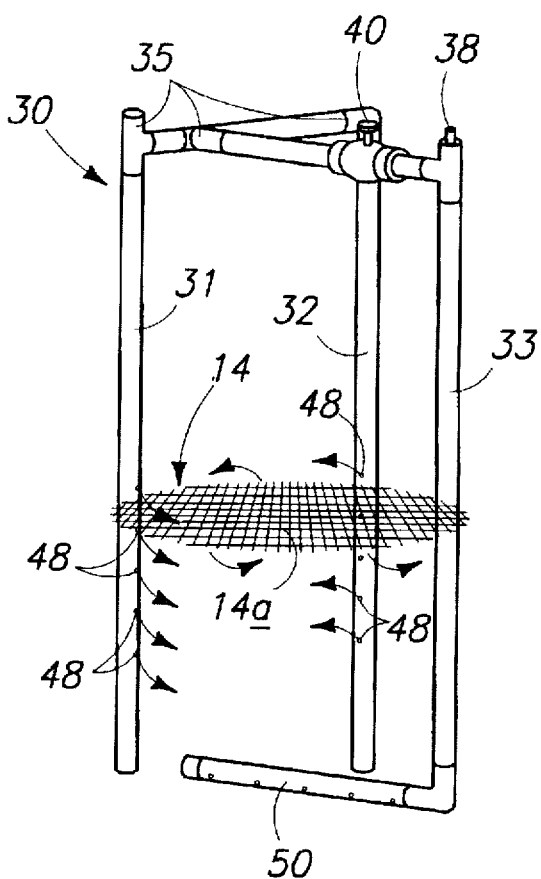
FIG. 5 is a perspective view of the FIG. 4 support structure with a filter mounted thereon to illustrate the backflushing principles of the invention.
Figure 6:
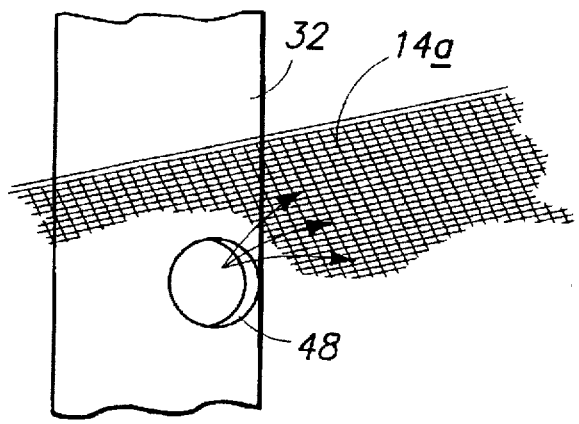
FIG. 6 is a fragmentary detailed view taken from FIG. 5 to further illustrate the backflushing principles of the invention.

Effluent pumping systems are susceptible to the clogging effect of suspended particles as a result of the flow patterns of effluent through the filter. In a typical pumping system, septic system effluent is withdrawn from a relatively clear-water zone and drawn through a filter before reaching the pump. The unidirectional flow through the filter causes solid waste particles to accumulate on the filter surface or within the filter elements so as to progressively reduce the efficiency of the filter until it is completely clogged.

The system of the present invention provides a pump vault 10 that houses a pump, and a plurality of effluent filters 14 located in a filter compartment 16 within the pump vault 10. A bottom plate 20 is positioned transversely across the pump vault interior, below the inlets 18, to close off the bottom of the filter compartment 16. The pump vault is provided with a plurality of effluent inlet orifices 18 through the bottom plate 20. The elevation of bottom plate 20 is selected, relative to the bottom of the tank 60, so as to locate the inlet openings 18 well above the bottom sludge-collecting zone of the tank 60. The effluent filters 14 are provided as disks located transversely across the vault 10 above the inlets 18 so that effluent from without the pump vault 10 will enter the filter compartment 16 at the bottom thereof and pass upward through the series of transverse filters 14. The pump vault 10 is provided with a top plate 22 that is positioned transversely across the pump vault interior to close off the top of the filter compartment 16. In the FIG. 1 embodiment, the top plate 22 also provides a direct support for a centrifugal effluent pump 12. In the FIG. 10 embodiment, the top plate 22 provides an indirect support for a turbine effluent pump 13, there being a turbine pump vault 15 extended downward from the top plate 22 through the filter compartment 16 and into pump vault interior below the filter compartment bottom plate 20 for containing the turbine pump. The effluent pump, 12 or 13, draws effluent through the inlets 18 and upwardly through the filter compartment 16, serially through the filters 14, and discharges the filtered effluent through a discharge conduit 24 to the next stage of the septic system.

The effluent filters 14 are preferably provided as filter screens 14a formed of a suitable material, such as a polyethylene screen having a suitable mesh size, that are mounted on peripheral mounting rims 14b. Typically, the screens 14a of filters 14 would have mesh sizes selected to provide an increasingly fine filtering action as effluent passes upwardly through the filter compartment 16.

The effluent filters 14 are supported by a combined filter support structure and backflush assembly 30. Assembly 30 comprises three vertical conduits, 31, 32, 33, that are supported by the filter compartment bottom plate 20. The bottom ends of the vertical conduits are closed. The vertical conduits traverse the interior side wall of the pump vault 10. The filter mounting rims 14b are secured to the vertical conduits by appropriate means and the filter screens 14a are set upon and secured to their respective mounting rims. As illustrated, the mounting rims extend around the inwardmost points of the vertical conduits and the filter screens extend over the rims to the inner side wall of the pump vault 10. The peripheries of the screens 14a are formed so as to abut the pump vault inner side wall so as to subdivide the filter compartment 16 in a vertical series of filtering sections 14c. In a preferred arrangement of filters 14, each filtering section 14c would have a height of about 2 inches. As thus disposed, the vertical conduits, 31–33, comprise vertical support legs for the filters 14. The mounting rims 14b may be conveniently formed from PVC pipe so as to have a small vertical height and a relatively narrow transverse thickness. Such mounting rims 14b could be secured to the support legs (conduits 31–33) by solvent welding. At the top of the pump vault 10, the three vertical conduits, 31, 32, 33, are connected by a manifold 34 that comprises appropriate conduit sections 35, such as elbow joint and Tee sections. The manifold 34 is connected to the discharge conduit 24 from the pump, 12 or 13, through a backflush valve 36. The manifold may also be provided with an air connection 38 leading to one of the vertical conduits 33 and an air valve 40 connecting the other two conduits 31, 32 to the air connection 38. A discharge valve 42 connects the discharge conduit 24 to a check valve 44. The manifold may also be provided with a hose bib 46.

Two of the vertical conduits, 31, 32, are backflush conduits. These conduits are provided with a backflush orifices 48 at locations just above the elevation of the filter screens 14a. These backflush orifices 48 are oriented non-radially with respect to the screens' upper surfaces to direct flow in a circular pattern across their upper surfaces. Typically, the backflush orifices 48 would have diameters of about 3/16 inches.

The third vertical conduit 33 is an air conduit. It is provided with a radially-extending bottom manifold conduit 50 that extends across the bottom plate 20 within the lowermost filtering section 14c. It is provided with a series of air discharge apertures 51.

Figure 10:
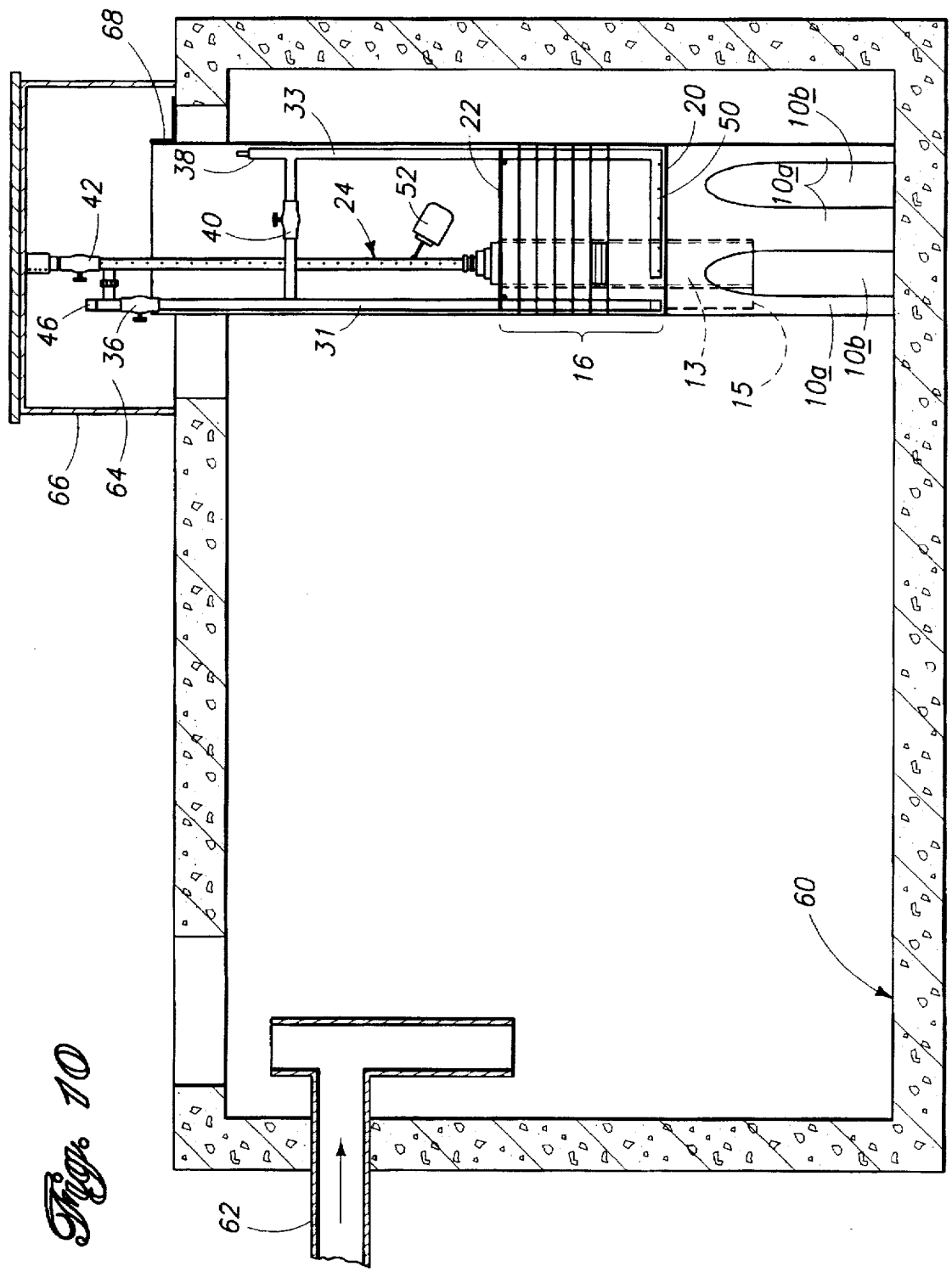
FIG. 10 is a vertical cross-section through a pump tank or chamber incorporating a second embodiment of a filtered pumping system in accordance with the principles of this invention, including a pump vault that houses a column of filter screens supported by a support structure and a top plate for supporting a turbine effluent pump.
Figure 11:
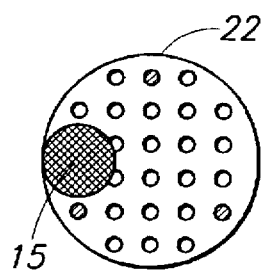
FIG. 11 is a top plan view of the top plate of the FIG. 10 assembly illustrating the location of a turbine pump vault.
Figure 10A:
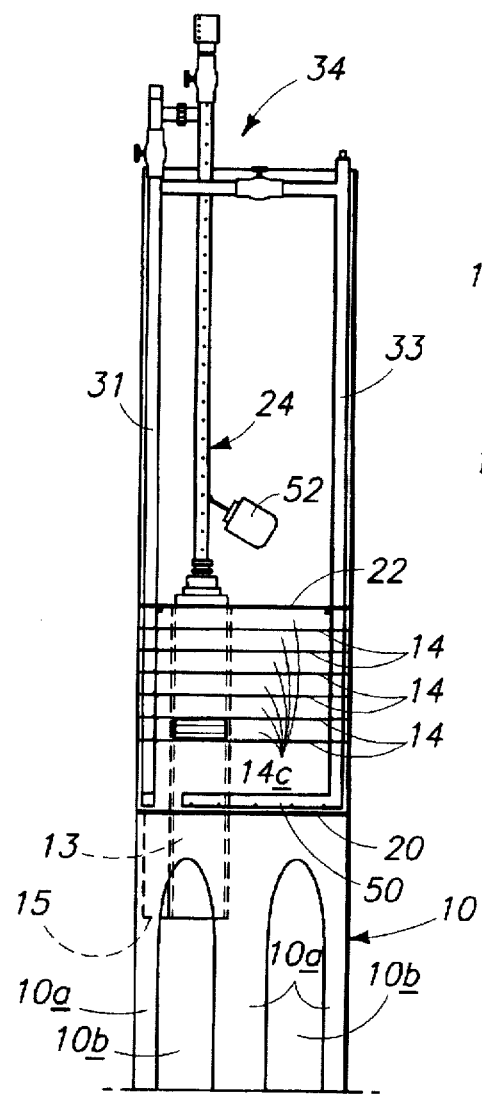
FIG. 10A is a vertical elevation view of the pump vault of the FIG. 10 embodiment.
Figure 12:
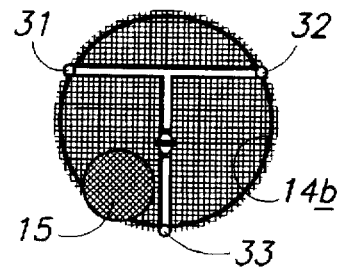
FIG. 12 is a top plan view of the top filter screen of the FIG. 10 embodiment with the top plate removed illustrating the filter support structure and the turbine pump vault.
Figure 13:
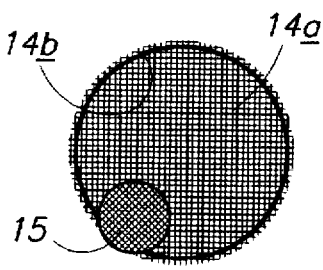
FIG. 13 is a top plan view of one of the filter screens illustrating the location of the turbine pump vault.

In addition to the foregoing elements, the FIG. 10 embodiment additionally is provided with the turbine pump vault 15. The top and bottom plates 22, 20 and the filter screens 14a are formed to enclose the periphery of the vault 15 to segregate the filtering sections 14c from one another.

In both the FIG. 1 and FIG. 10 embodiments, a liquid level off control, such off float 52 is provided as part of a control system. An appropriate control system would function to maintain the liquid level with the pump vault interior at a level that would insure that the filter compartment 16 is submerged at all times during use of the septic system. The top plate 22 is perforated so that liquid will rise from the filter compartment 16 up into the pump vault interior above plate 22, up to the elevation of the body of liquid in which the pump vault 10 is placed.

In both embodiments, the pump vault 10 is illustrated as being installed in a pump tank or compartment 60. Tank 60 is provided with a liquid inlet 62 from some previous septic system component. In a typical installation within such a tank 60, the pump vault 10 would be provided as a 15 inch or 18 inch diameter PVC vault cylinder. The cylinder would extend from the bottom of tank 60 up to the top of tank 60. Tank 60 would be provided with a suitable access opening 64 closed by a cover assembly 66. The bottom plate 20 would be located about 21 inches from the floor of tank 60. The filter compartment 16 would have a height of about 14 inches and accommodate six filter screens 14a. In a typical gravity-fed inflow septic system, the relative elevations of the inlet 62 and top plate 22 would insure that the filter compartment 16 would remain submerged at all times during use of the septic system. A bracket 68 holds the pump vault 10 to the side of the access opening 64.

The system illustrated in FIGS. 1 and 10 is suitable to be added as a downstream effluent filtering component from a primary septic system component, such as a grease trap or septic tank. the pump vault 10 and its associated elements as described above, could be incorporated into a primary system component so long as the inlets 18 are located in the mid-zone of the primary system component, above the sludge layer and below the scum layer in the so-called clear water or settling zone.

In normal operation, with the discharge valve 42 open and with the air valve 40 and the backflush valve 36 closed, the FIG. 1 and FIG. 10 embodiments operate to pump effluent through the filter compartment 16 and to discharge the filtered effluent through discharge conduit 24, discharge valve 42 and check valve 44. The screen disks 14a are perpendicular to the flow of effluent through the filter chamber 16, thereby maximizing the exposure of the effluent to the screens. Screens of various mesh sizes may be used, depending on the application. More than one mesh size will typically be used in every application with the largest mesh size at the bottom and with the mesh size progressively decreasing as effluent flow progresses from the inlets 18 to the pump 12, 13. The screen disks 14a are supported by disk support rings or rims 14b. The bottom plate 20 carries the weight of the filter support structure 30 and the pump and the piping and valving associated with the pump and the support structure conduits 31–33.

When filter cleaning or clearing is desired, the backflushing assembly is brought into operation in the following manner.

Excessive biological growth and/or solid waste particles can be washed off the screens 14a by closing the discharge valve 42, closing the air valve 40 and opening the backflush valve 36, and then operating the pump, 12 or 13. This connects the two backflush conduits 31, 32 with the pump discharge conduit 24 so that screened effluent from within the pump vault interior above the top plate 22 is pumped through the backflush conduits 31, 32 and out through the backflush orifices 48 onto the upper surfaces of the screens 14a. Because of the non-radial orientation of the orifices 48, the backflushed liquid is circulated in a circular or swirling pattern across the upper surfaces of the screens 14a, thereby maximizing the cleaning action on the screens. Recirculation of the screened effluent would continue until the screens 14a are clear.

An alternate procedure to clear the screens 14a would be to close the discharge valve 42 and air valve 40, as above, but to also close the backflush valve 36 and remove cap on the hose bib 46. This connects the two backflush conduits 31, 32 with the hose bib 46 so that water from an external source—such as a garden hose—can be flushed through the backflush conduit orifices 48 to clear the screens 14a.

The third leg of the support structure, air conduit 33, can be activated by closing air valve 40 so that high pressure air—from an external source—can be applied through air connection 38 so that air is introduced to the bottom of the filter compartment 16 through air discharge manifold 50.

The backflush orifices 48 can be charged by either the pump 12, 13 or a local water source and a garden hose. To backflush the screens 14a using the pump, the air and discharge valves 40, 42 must be closed and the backflush valve 36 must be open. This will direct the flow to the backflush orifices 48. To clean the screens 14a using a garden hose, the backflush valve 36 and the air valve 40 must both be closed and a garden hose hooked to the hose bib and turned on. Air can be introduced below the screens 14a to increase aerobic biological activity inside the pump vault 10, scour the screens, or to increase the dissolved oxygen level in the effluent being discharge to a downstream septic system component. By appropriate opening and closing of the control valves, air or water can be sent to all three conduits 31–33.

The pump vault 10 may be suspended from the access opening 64. However, that is a more complex assembly than that illustrated in the Figures. The pump vault 10 illustrated in the Figures that extends to the bottom of the pump tank 60 is suitable for installations where the pump tank is not a primary septic tank. If the pump vault 10 is to be installed in a primary septic tank, the depth of the tank may warrant fabricating the pump vault 10 for suspension from an access opening rather than for support from the floor of the septic tank.

In a preferred configuration of the pump vault 10, in the form of a PVC pipe, the bottom end, below the bottom support plate 20, is cut out to provide alternating legs 10a and effluent passages 10b While the preferred embodiment of the invention has been described herein, variations in the design may be made. The scope of the invention, therefore, is only to be limited by the claims appended hereto.

The embodiments of the invention in which an exclusive property is claimed are defined as follows:

I claim:

1. A septic system filtered pump vault which comprises a housing for an effluent pump, said housing having an effluent inlet communicating with a filter 5 compartment within said housing; a plurality of effluent filters contained within said filter compartment; filter support means within said housing, said filters being secured to said filter support means in spaced relation to one another so as to provide filtering sections between said filters, said filter support means including at least one backflush conduit provided with a plurality of backflush orifices oriented to direct backflush fluid into said filtering sections onto upper surfaces of said filters; pump means including an effluent pump contained within said housing for effecting flow of effluent through said effluent inlet and through said filters, said pump means including discharge conduit means for discharging filtered effluent from said housing; and valve means communicating with said backflush conduit and said discharge conduit means so that said pump may be selectively communicated with said backflush conduit to effect backflushing of said filters with filtered effluent.

2. The apparatus of claim 1 wherein said filter support means includes at least two backflush conduits, each being provided with a plurality of backflush orifices oriented to direct backflush fluid into said filtering sections onto upper surfaces of said filters; said valve means communicating with both backflush conduits so that filtered effluent may be directed through both backflush conduits.

3. The apparatus of claim 2 wherein said filter support means includes an air conduit having an air discharge manifold, said air discharge manifold having air discharge orifices oriented to direct air into said filter compartment; said valve means communicating with said air conduit so that air from an external source may be selectively directed into said air discharge conduit for selectively aerating effluent contained with said filter compartment.

4. The apparatus of claim 1 wherein each of said filters comprises a filter screen disk and a mounting rim, said mounting rim being secured to said backflush conduit at an elevation vertically below a backflush orifice so that backflush fluid will be directed onto an upper surface of said filter screen disk.

5. The apparatus of claim 1 wherein said backflush conduit is provided with a set of two backflush orifices at each filter location; and wherein each of said filters comprises a filter screen disk and a mounting rim, said mounting rim being secured to said backflush conduit at an elevation vertically below a backflush orifice set so that backflush fluid will be directed onto an upper surface of said filter screen disk.

6. The apparatus of claim 5 wherein said filter compartment is confined between a bottom plate and an apertured top plate, with said filters being located between the bottom and top plates; said bottom plate having apertures therethrough so as to provide said effluent inlet.

7. The apparatus of claim 2 wherein each of said filters comprises a filter screen disk and a mounting rim, said mounting rim being secured to said backflush conduits at an elevation vertically below a backflush orifice so that backflush fluid will be directed onto an upper surface of said filter screen disk.

8. The apparatus of claim 2 wherein said backflush conduits are each provided with a set of backflush orifices at each filter location; and wherein each of said filters comprises a filter screen disk and a mounting rim, said mounting rim being secured to said backflush conduits at an elevation vertically below a backflush orifice set so that backflush fluid will be directed onto an upper surface of said filter screen disk.

9. The apparatus of claim 8 wherein said filter compartment is confined between a bottom plate and an apertured top plate, with said filters being located between the bottom and top plates; said bottom plate having apertures therethrough so as to provide said effluent inlet.

10. The apparatus of claim 3 wherein each of said filters comprises a filter screen disk and a mounting rim, said mounting rim being secured to said backflush conduits and to said air conduit at an elevation vertically below a backflush orifice so that backflush fluid will be directed onto an upper surface of said filter screen disk; and wherein said air discharge manifold is located at the bottom of said filter compartment below said filters.

11. The apparatus of claim 3 wherein said backflush conduits are each provided with a set of backflush orifices at each filter location; and wherein each of said filters comprises a filter screen disk and a mounting rim, said mounting rim being secured to said backflush conduits at an elevation vertically below a backflush orifice set so that backflush fluid will be directed onto an upper surface of said filter screen disk; and wherein said air discharge manifold is located at the bottom of said filter compartment below said filters.

12. The apparatus of claim 11 wherein said filter compartment is confined between a bottom plate and an apertured top plate, with said filters being located between the bottom and top plates; said bottom plate having apertures therethrough so as to provide said effluent inlet.

* * * * *